United States Patent [19]
Reiser

[11] Patent Number: 5,156,040
[45] Date of Patent: Oct. 20, 1992

[54] METHOD AND APPARATUS FOR VERIFYING THE EFFECTS OF A MOTOR VEHICLE ACCIDENT

[75] Inventor: Karl-Heinz Reiser, Tauberfeld, Fed. Rep. of Germany

[73] Assignee: Technischer Überwachungs-Verein Bayern e.V., Fed. Rep. of Germany

[21] Appl. No.: 701,177

[22] Filed: May 16, 1991

[30] Foreign Application Priority Data

Aug. 31, 1990 [DE] Fed. Rep. of Germany ....... 4027711

[51] Int. Cl.[5] .............................................. G01N 3/30
[52] U.S. Cl. .................................................. 73/12
[58] Field of Search .................... 73/869.9, 12; 340/825.72; 180/167

[56] References Cited

U.S. PATENT DOCUMENTS 2,408,472 10/1946 Moynihan ................. 340/825.72 X
3,606,957 9/1971 Fuzzell ........................ 180/167 X

FOREIGN PATENT DOCUMENTS 2004979 4/1974 Fed. Rep. of Germany .

OTHER PUBLICATIONS

"Vehicle Instrumentation for Crash Testing", Harold P. Snider, IEEE Transactions on IECI, Feb. 1964, pp. 44-49.

Aston, T. R., Impact Testing of Motor Vehicles from IEETE Journal (GB) vol. 6, No. 4, Jan. '72, pp. 3-7.

Primary Examiner—Jerry W. Myracle
Attorney, Agent, or Firm—Finnegan, Henderson, Farabow, Garrett & Dunner

[57] ABSTRACT

Apparatus and method for verifying effects of a motor vehicle accident involving at least one vehicle adapted to be advanced towards a pre-defined point of collision at a predetermined speed. The apparatus and method provides for the employ of a drive mechanism for setting the vehicle into motion.

In order to be independent of the type of vehicle and at the same time to be able to achieve a realistic accident sequence including the simulation of different braking operations and speed variations as well as a start motion procedure building up to a preselected speed, the vehicle's own drive mechanism, an optionally provided clutch and the vehicle's brake are adapted to be controlled by actuators connected to a fluid pressure actuating and control system including a supply reservoir and a number of selectively controllable valves for the simulation of an accident.

29 Claims, 5 Drawing Sheets

METHOD AND APPARATUS FOR VERIFYING THE EFFECTS OF A MOTOR VEHICLE ACCIDENT

DESCRIPTION

The invention relates to apparatus and a method for verifying effects of a motor vehicle accident involving at least one motor vehicle adapted to be directed to a pre-defined point of collision at a predetermined speed, and a drive mechanism for the vehicle.

Apparatus and methods of this type are employed for instance in so-called crash tests. In these tests, a motor vehicle is displaced towards the pre-defined point of collision by means of pulling or pushing mechanisms engaging the vehicle from the outside.

The vehicle is thus for instance put into motion by means of a pulling rope guided over sheaves and having suitable pull weights and the vehicle attached to its opposite ends. The pull weights have to be selected in accordance with the vehicle's weight, and have to be initially determined in accordance with the type of vehicle and/or its loading state. As a result of the pulling rope being guided over sheaves, the pull weights move in the vertical direction and are accelerated by the force of gravity to thereby accelerate the vehicle.

When the vehicle arrives at the point of collision before the pull weights touch down on the floor, the collision occurs while the vehicle is still being accelerated. When the weights touch down on the floor at an earlier time, the vehicle collides at substantially the maximum attainable speed. In both cases there is the disadvantage that it is very difficult to determine the speed at the instant of collision. That is because ot this purpose the mass of the pull weights, the starting point of the vehicle, friction losses and other influence factors have to be taken into account.

Another disadvantage results from the fact that the vehicle is displaced "artificially". Any effects caused by the vehicle's own drive mechanism can therefore be only imitated rather imperfectly.

It is moreover not possible to imitate variations of the vehicle's speed resulting from braking manoeuvers or accelerations. An emergency braking manoeuver immediately prior to the collision is likewise out of the question.

It is therefore an object of the invention to provide an apparatus and method of the type defined above for verifying effects of a vehicle accident, which may be employed with vehicles of any type and permit the development of an accident including braking manoeuvers and speed variations to be realistically imitated.

This object is attained, as regards an apparatus of the type defined in the generic clause of claim 1, and as regards the method of the type defined in the generic clause of claim 20, by the provision that for imitating an accident the vehicle's own drive mechanism, an optionally provided clutch and the brake are connected through respective actuators to a fluid pressure actuating system including a supply reservoir and selectively controllable valves.

The employ of the vehicle's own drive mechanism permits a predetermined speed to be attained in a simple manner. At the same time it is possible to investigate the effects of the accident on the running engine. The additional controlled actuation of the clutch and brake permits the vehicle to be manoeuvered as in real traffic, and an accident to be realistically imitated. Likewise possible is a braking operation at a defined point, or of successive braking operations to thereby realistically imitate the conditions encountered in real traffic. The selectively controllable valves permit the respective actuators for the vehicle engine, the clutch and the brakes to be separately or simultaneously operated in accordance with the accident to be simulated. The apparatus does not have to be adapted to different types of vehicles, and the location of the vehicle prior to its acceleration, friction losses and other contributing factors need not be specifically be taken into account prior to the simulation of the accident. The adaptation to these factors can take place during the simulation by means of the vehicle's own drive and brake mechanisms.

In an advantageous embodiment of the invention, the pressure supply reservoir is connected in parallel to an inlet port of a relay valve by a relay conduit, to brake valves, an accelerator control valve and a start motion switch by a control conduit, and to an inlet port of a mechanical actuator by a supply conduit. The parallel arrangement of the individual pressure conduits permits the corresponding actuating devices to be operated individually or in combination. In this manner it is possible to realize different braking manoeuvers and speed variations in a simple manner. The mechanical actuator additionally permits the motor vehicle to be transferred for instance from one location to another by an operator. The operator or driver of the vehicle may for instance control the steering mechanism and the mechanical actuator, while the vehicle's speed is controlled from the outside for driving the vehicle in a simple manner to the starting point of the testing range.

In order to readily adjust the pressure in the supply reservoir to the pressure required at any given time for the operation of the actuators, it is particularly preferred to provide a pressure reduction valve downstream of the supply reservoir for reducing the supply pressure. The actuators are thus not directly connected to the supply reservoir, but rather through the pressure reduction valve disposed therebetween.

In order to permit the pressure fluid flow between the pressure reduction valve and a brake actuator to be readily controlled, the relay valve advantageously has one inlet port connected to the pressure reduction valve and an outlet port connected to the brake actuator. By suitably controlling the relay valve it is possible to apply a higher or lower pressure to the brake actuator, so that a braking manoeuver can be simulated in any desired manner.

For permitting the vehicle's own brake system to be readily incorporated in the brake actuator, an advantageous embodiment of the invention provides that the brake actuator is formed as a serial arrangement including a biasing cylinder and a main brake cylinder downstream thereof.

In the case of a braking operation, particularly an emergency braking operation, the clutch may be set to its release position and the accelerator to its idling position simultaneously with the application of the brakes, when the outlet port of the relay valve is connected to a first inlet port of a two-way clutch valve the outlet port of which is connected to the clutch actuator and parallel thereto, to a first inlet port of a two-way accelerator valve having its outlet port connected to the accelerator actuator. In this manner, the application of pressure to the brake actuator results in the simultaneous operation of the clutch actuator to thereby set the clutch to its release position. After the braking operation has been terminated, the reduction of the applied pressure permits the clutch to return to its engaged position and the brakes to be released. In this manner it is possible to execute successive speed variations or braking manoeuvers.

In this context it is of further advantage to provide an accelerator throttle between the accelerator actuator and the two-way accelerator valve. In this case, the setting of the clutch to its release position simultaneously causes the pressure applied to the accelerator actuator to be reduced to thereby set the accelerator to a predetermined idling position. In the case of a speed variation the pressure applied to the clutch is reduced, and at the same time the pressure applied to the accelerator actuator is increased with the aid of the throttle. In this manner it is possible to also simulate a start-motion procedure.

It is of course also possible to employ an automatic transmission rather than a gear shift transmission. In this case there is no clutch to be actuated, and the automatic transmission is simply set to selector positon "D".

In order to permit the pressure applied to the accelerator actuator to be controlled independently of the relay valve, the accelerator control valve is advantageously connected to a second inlet port of the two-way accelerator valve. The accelerator control valve may thus be used for varying the vehicle's speed within the range of the selected gear in the case of a gear shift transmission, or of the selected setting in the case of an automatic transmission. By increasing or lowering the pressure applied to the accelerator actuator the vehicle's speed can be increased, a predetermined speed can be maintained, or the speed can be reduced under the influence of friction losses.

For permitting the braking manoeuvers to be readily controlled with the aid of the relay valve, it is of particular advantage when the brake valves are connected substantially in parallel to a control inlet port of the relay valve. This permits the pressure applied to the brake actuator to be readily controlled with the aid of the brake valves. One brake valve may for instance be designed as a current failure valve responsive to failure of the control of the fluid pressure actuating system for initiating an emergency braking operation of the vehicle. This would preclude the possibility of an uncontrolled simulation of a motor vehicle accident. The other brake valve on its part may be designed for the execution of an intentional emergency braking operation and for the regular operation of the brake actuator for the simulation of braking manoeuvers.

In an advantageous embodiment of the invention, a two-way brake valve may be provided between the brake valves and the control inlet port of the relay valve, in which case the first inlet port of the two-way brake valve is connected to the brake valves, and its outlet port to the control inlet port of the relay valve. In this case the brake valves are not connected in parallel to the control inlet port of the relay valve, but rather connected to one another upstream of the two-way brake valve or at the first inlet port thereof. A further inlet port of the two-way brake valve may be used for other purposes contributing for instance to the control of the braking operation.

In this contest it is particularly advantageous when an outlet port of the mechanical actuator is connected to a second inlet port of the two-way brake valve. This results in an overall simplification of the fluid pressure actuating system and at the same time in an increased reliability and safety thereof with regard for instance to a braking operation. The operation of the mechanical actuator from inside the vehicle permits the brakes to be applied without any outside intervention as for instance in the case of a transfer of the vehicle. The current failure valve permits an emergency braking operation to be automatically executed in the case of failure of the vehicle control system. The second brake valve permits a controlled braking operation to be executed in the absence of a driver in the vehicle.

For the initiation of the start motion procedure it is of advantage when the start motion switch is connectd to a second inlet port of the two-way clutch valve. In the open state of the start motion switch, pressure can be applied to the clutch actuator through the two-way clutch valve, and also to the accelerator actuator via the associated connecting conduit. In this manner the clutch is set to its release position, and the accelerator actuator is set to its idling position with the aid of the accelerator throttle, so that the vehicle is maintained in the idling state. This state may be used in the stand-by phase of the vehicle preparatory to the simulation of the accident, but also for purely inertial travel of the vehicle during the simulation phase.

In an advantageous embodiment a stop valve is provided in the connecting conduit between the start motion switch and the two-way clutch valve for maintaining a given pressure in the connecting conduit. In this manner the control of the pressure between the clutch and accelerator actuators and the closed start motion switch permits a certain pressure to be conserved and to be used for maintaining the idling state or for controlling the start motion procedure.

In this context it is particularly advantageous to provide a pressure reduction switch downstream of the stop valve in parallel to its connection to the two-way clutch valve. The pressure reduction switch is adapted to be opened to thereby release the pressure between the stop valve and the two-way clutch valve. At the same time the accelerator throttle permits the pressure applied to the clutch actuator to be reduced, and the pressure applied to the accelerator actuator to be simultaneously increased. As a result, the clutch is set from its release position to its engaged position, and synchroneously therewith the accelerator actuator is displaced from its idling position to thus initiate a start motion procedure.

In an advantageous embodiment of the invention a throttle is provided downstream of the pressure reduction switch. The combination of these two devices permits a pressure to be readily released in a controlled manner.

In an advantageous embodiment of the invention, the supply container is a compressed-air supply reservoir. All of the pressure conduits and actuator devices are designed for operation by compressed air. In the case of vehicles themselves already equipped with an hydraulic system it is of course also possible to employ a suitably adapted fluid pressure actuating system. The apparatus by itself is capable of adaptation to any type of pressure operation.

In order to simplify the operation of the various valves, the brake valves and/or accelerator control valves are advantageously designed as solenoid valves. In this case the current failure valve would be maintained in the closed position by the application thereto of a voltage, while a current failure would cause it to open for initiating an emergency braking operation. The other brake valve would be inversely controllable to open in response to a voltage being applied thereto while being normally closed. The accelerator control valve would be designed in the same manner.

In order to permit the apparatus to be controlled from ouside in a particularly simply manner, the switches and/or solenoid valves and/or throttles are advantageously radio-controllable. It is likewise also possible, however, to entrust a vehicle-borne computer with the overall control of the vehicle. In this case the current failure solenoid valve could be designed for control from outside, in the case for instance of a program error.

In order to permit the vehicle's brakes to be again released, for instance after an emergency braking operation, it is advantageous to provide a braking pressure release device at least for the main braking cylinder. This device may for instance be a simple bleeding device for the main braking cylinder. In this case an immediate start motion procedure is possible from the standby idling state following a braking operation.

The solutions proposed by the invention and advantageous embodiments thereof shall now be explained and described in detail with reference to the figures of the accompanying drawings, wherein.

Figure 1:
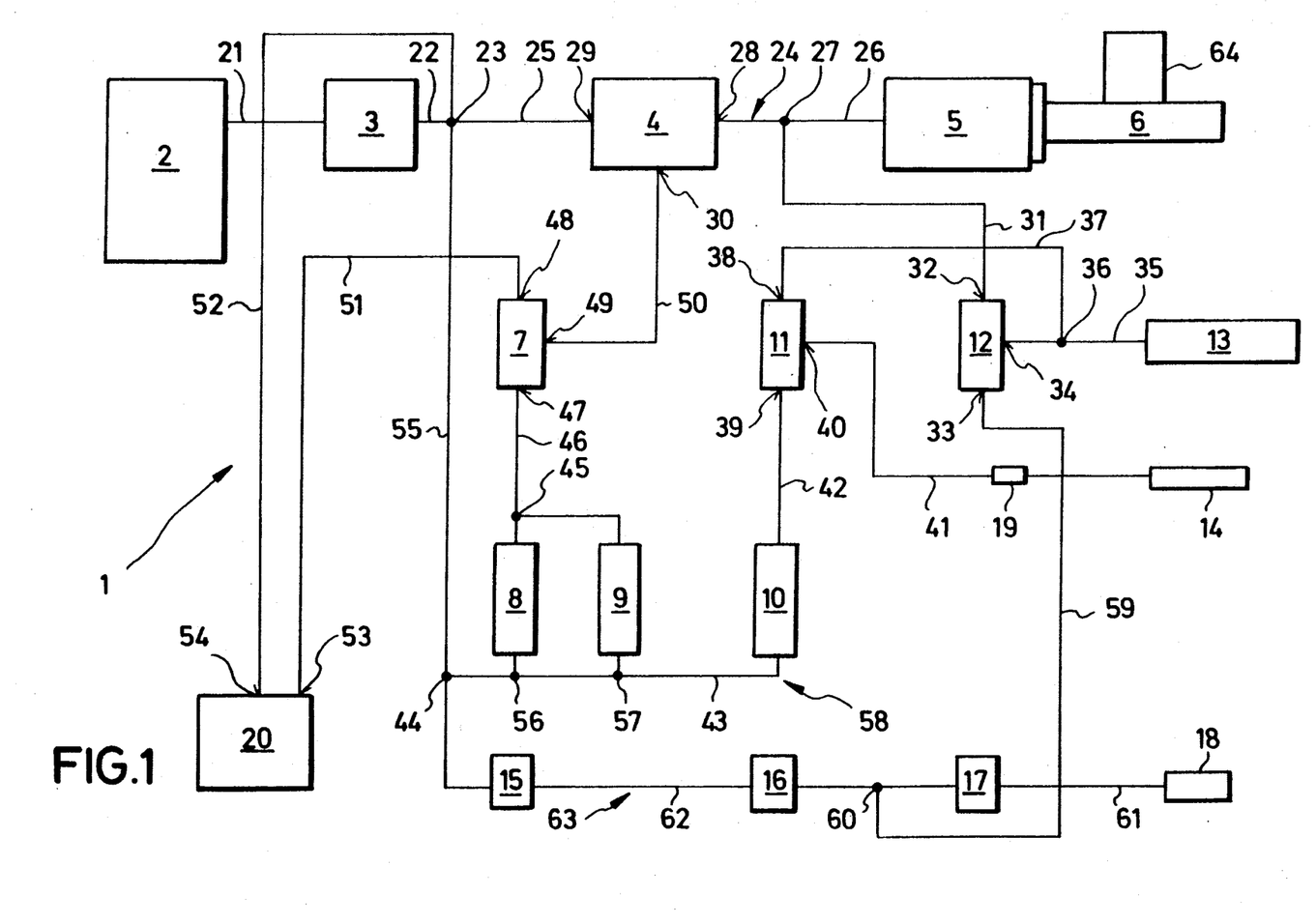
FIG. 1 shows a block diagram of the apparatus according to the invention.

FIG. 1 shows the apparatus according to the invention in the form of a block diagram. A fluid pressure actuating system 1 includes a plurality of symbolically depicted actuating devices such as valves, switches, actuators and the like, selected ones of which are interconnected by respective conduits. The overall system 1 is installed in a vehicle in combination with the vehicle's own drive and brake mechanisms.

A pressure fluid supply reservoir 2 is connected via a pressure conduit 21 to a pressure reduction valve 3, the latter being connected by a further pressure conduit 22 to a branching point 23, whereat pressure conduit 22 is branched into three pressure conduits 25, 52, 55. Conduit 25 is a relay conduit connecting a relay valve 4 to supply reservoir 2 via pressure reduction valve 3, conduit 52 is a supply conduit and conduit 55 is a control conduit connecting a mechanical actuator 20, solenoid valves 8, 9 and 10 and a start motion switch 15, respectively, to supply reservoir 2 via pressure reduction valve 3.

Relay valve 4 has a relay inlet port 29 connected to relay conduit 25, a relay outlet port 28 connected to brake actuating conduit 24, and a relay control inlet port 30 connected to relay control conduit 50. Brake actuating conduit 24 connects a biasing cylinder 5 and a main brake cylinder 6 disposed downstream thereof to relay outlet port 28.

Provided in brake actuating conduit 24 between relay valve 4 and biasing cylinder 5 is an idling branch-off point 27 whereat an idling control conduit 31 is connected. Conduit 31 leads to a first inlet port 32 of a two-way clutch valve 12 so as to connect the latter to relay valve 4. A clutch acuator 13 is connected to two-way clutch valve 12 through an outlet port 34 thereof and a clutch control conduit 35.

An accelerator-clutch branch point 36 is provided in clutch control conduit 35 between clutch actuator 13 and two-way clutch valve 12. Connected to branch point 36 is an accelerator control conduit 37 leading to a first inlet port 38 of a two-way accelerator valve 11 to thereby establish communication between the latter and the outlet port 34 of two-way clutch valve 12. Connected to an outlet port 40 of twp-way accelerator valve 11 by an accelerator control conduit 41 is an accelerator throttle 19 and downstream thereof an actuator for the vehicle's own drive mechanism, particularly the accelerator.

Accelerator actuator 14 is connected via a second inlet port 39 of two-way accelerator valve 11 to an accelerator control solenoid valve 10. Disposed between the latter and second inlet port 39 of two-way accelerator valve 11 is an accelerator control conduit 42. Accelerator control solenoid valve 10 is disposed in a brake and accelerator control conduit 58 including an accelerator control valve and solenoid valve conduit 43 and accelerator control conduit 42, and connected to control conduit 55 at a branch point 44.

Provided in the accelerator control and solenoid valve conduit portion 43 of brake control and accelerator control conduit 58 between accelerator control solenoid valve 10 and branch point 44 are tow connection points 56 and 57 whereat two solenoid valves 8 and 9 are connected to accelerator control and solenoid valve conduit 43. At the downstream side relative to conduit 43 the current failure solenoid valve 8 and the brake actuating solenoid valve 9 are in communication with one another at a junction point 45, the later being connnected by a brake valve conduit 46 to a first inlet port 47 of a two-way brake valve 7. An output port 49 of two-way brake valve 7 is connected to relay control input port 50 of relay valve 4 by a relay control conduit 50.

A second inlet port 48 of two-way brake valve 7 is connected by a connecting conduit 51 to an outlet port 53 of mechanical actuator 20. The supply conduit 52 extending between an inlet port 54 of mechanical actuator 20 and branch point 23 connects the mechanical actuator 20 to pressure reduction valve 3 and thus to pressure fluid supply reservoir 2 for the application of pressure thereto.

Connected to branch point 44 of control conduit 55 substantially in parallel to brake control and accelerator conduit 58 is an idling control and start motion control conduit 63. Disposed downstream of branch point 44 is a start motion switch 15 operable to open and close this conduit, and connected to a stop valve 16 by a connecting conduit 62. Downstream of stop valve 16 idling and start motion control conduit 63 is provided with an auxiliary start motion control conduit 59 connecting stop valve 16 to a second inlet port 33 of two-way clutch valve 12, and thus through outlet port 34 thereof to clutch actuator 13, and through two-way accelerator valve 11 to accelerator actuator 14.

Downstream of stop valve 16 auxiliary start motion control conduit 59 has a banch point 60 having a pressure relief conduit 61 connected thereto. Immediately downstream of branch point 60 pressure relief conduit 61 contains a pressure reduction or relief switch operable to open or close pressure relief conduit 61. At the end of pressure relief conduit 61 opposite branch point 60 there is provided a throttle 18 for the pressure relief operation.

Different operative states of the apparatus according to the invention assumed in the performance of the method according to the invention shall now be discussed with reference to FIGS. 2 to 5.

In these figures, connecting conduits drawn in solid lines designate pressure-transmitting open connecting conduits. The conduits not immediately required for the illustrated operative state have been omitted for the sake of simplicity. The reference numerals have been selected in accordance with the ones denoted in FIG. 1, the selection having been restricted to reference numerals required for the description of the illustrated operative states.

Figure 2:
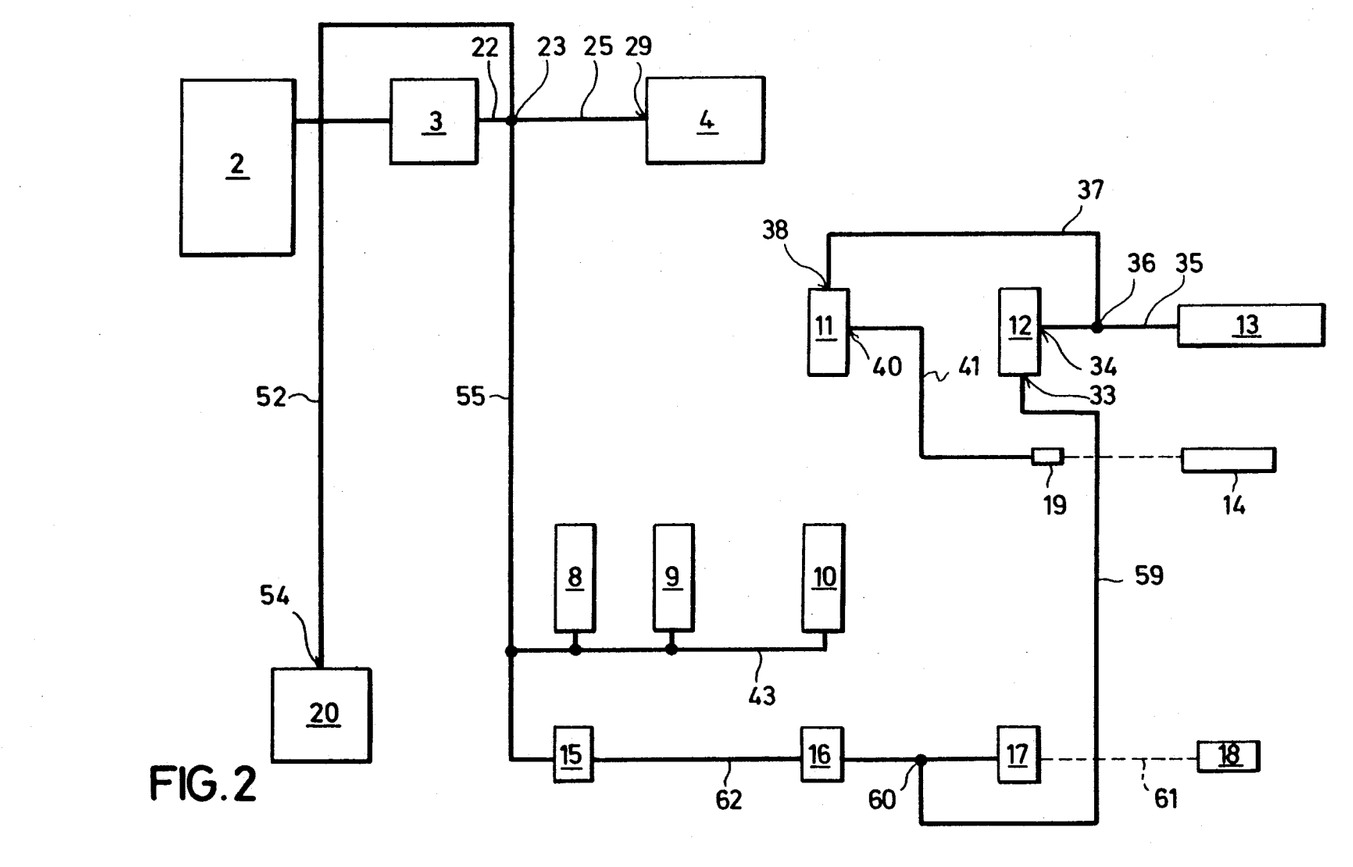
FIG. 2 shows the apparatus according to the invention in the idling state.

FIG. 2 shows the pressurization of the apparatus according to the ivention for establishing the idling state of a motor vehicle.

Pressure is applied through pressure reduction valve 3 and the associated connecting conduits to relay valve 4, mechanical actuator 20, solenoid valves 8, 9 and 10, and start motion swithch 15. Since all of the solenoid valves 8, 9 and 10, relay valve 4 and mechanical actuator 20 are in the closed state, the pressure conduits downstream thereof are closed off.

In contrast thereto, start motion switch 15 is in its open state, so that pressure relief switch 17 has pressure applied to it via connecting conduit 62 and stop valve 16, pressure being also applied to second inlet port 33 of two-way clutch valve 12 through auxiliary start motion control conduit 59.

Since pressure relief switcch 17 is closed, there is no pressure relief through pressure relief conduit 61 and pressure relief throttle 18. In place thereof, pressure is applied from outlet port 34 of two-way clutch valve 12 to clutch actuator 13, and to first inlet port 38 of two-way accelerator valve 11 through accelerator valve control conduit 37 branching off clutch control conduit 35. This pressure is also applied to accelerator control throttle 19 from outlet port 40 of two-way accelerator valve 11.

As a result of this pressurization state, the clutch is in its release position, and accelerator actuator 14 is in a pre-set idling position. The closed state of accelerator control throttle 19 prevents accelerator actuator 14 from having pressure applied thereto, so that it remains in the idling position.

In this manner it is possible to establish the idling state preparatory to the start motion procedure of the motor vehicle, or similarly after the vehicle has already been accelerated, for inertial coasting of the vehicle with its clutch in the release position and the accelerator in the idling position.

Figure 3:
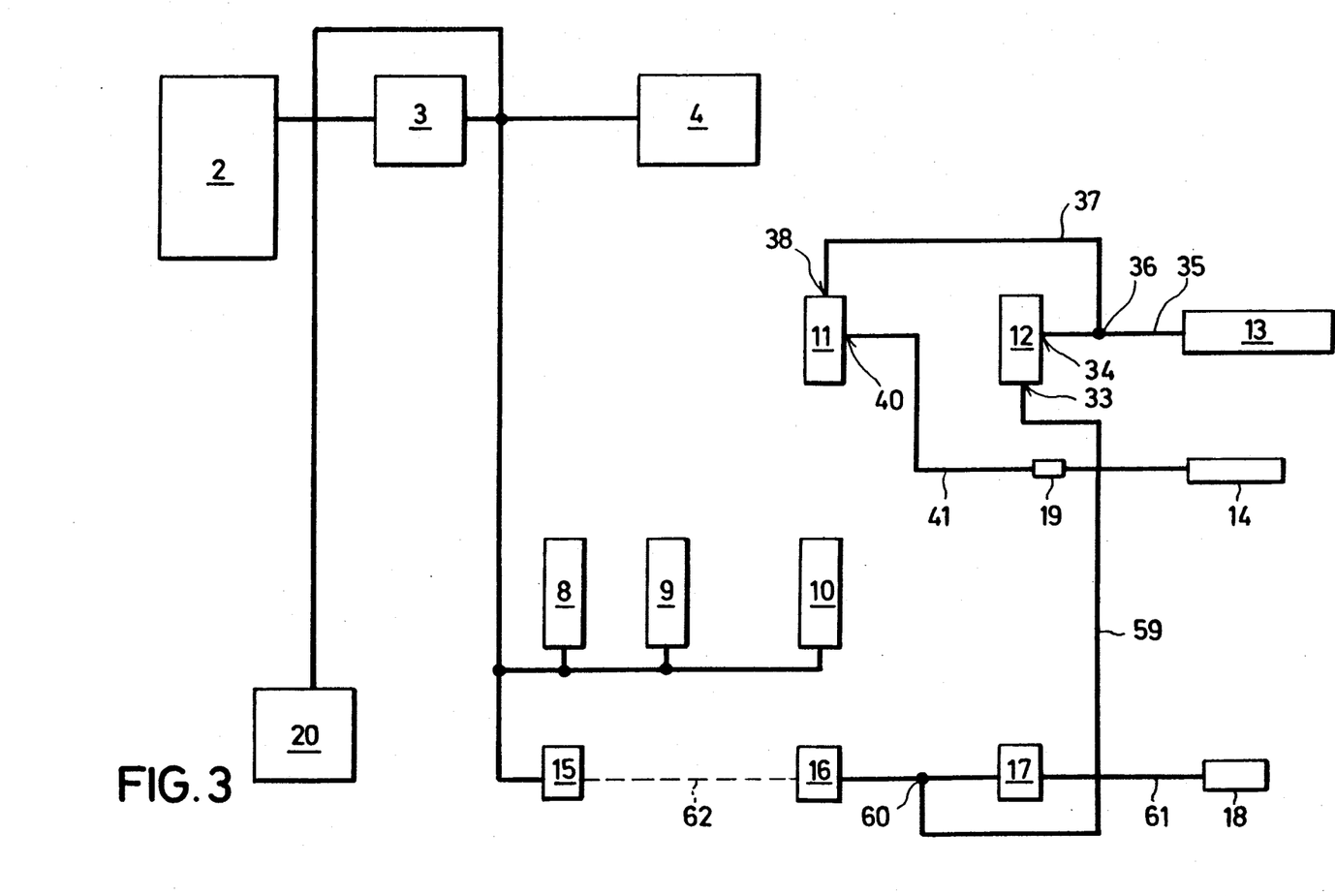
FIG. 3 shows the apparatus according to the invention in the start motion phase.

FIG. 3 depicts the start motion procedure following upon the idling state. In the state shown in FIG. 2, when start motion switch 15 is closed, stop valve 16 acts to maintain the previously applied pressure at least in auxiliary start motion control conduit 59 and conduits 35, 37 and 41 downstream thereof.

Pressure relief switch 17 is opened to relieve the pressure between second inlet port 33 of two-way clutch vavle 12 and stop valve 16. This permits the pressure to be relieved via pressure relief conduit 61 and throttle 18. The pressure existing between outlet port 34 of two-way clutch valve 12 and clutch actuator 13 is relieved by reducing the throttle action of accelerator control throttle 19. This results in an increase of the pressure between accelerator control throttle 19 and accelerator actuator 14, and thus in an increased fuel supply to the vehicle engine.

At the same time the reduction of the pressure applied to clutch actuator 13 causes the clutch to be set from the release position to the engaged position.

In this manner accelerator control throttle is effective to achieve a simultaneous clutch engagement operation and accelerator actuation, causing the vehicle to start moving.

Figure 4:
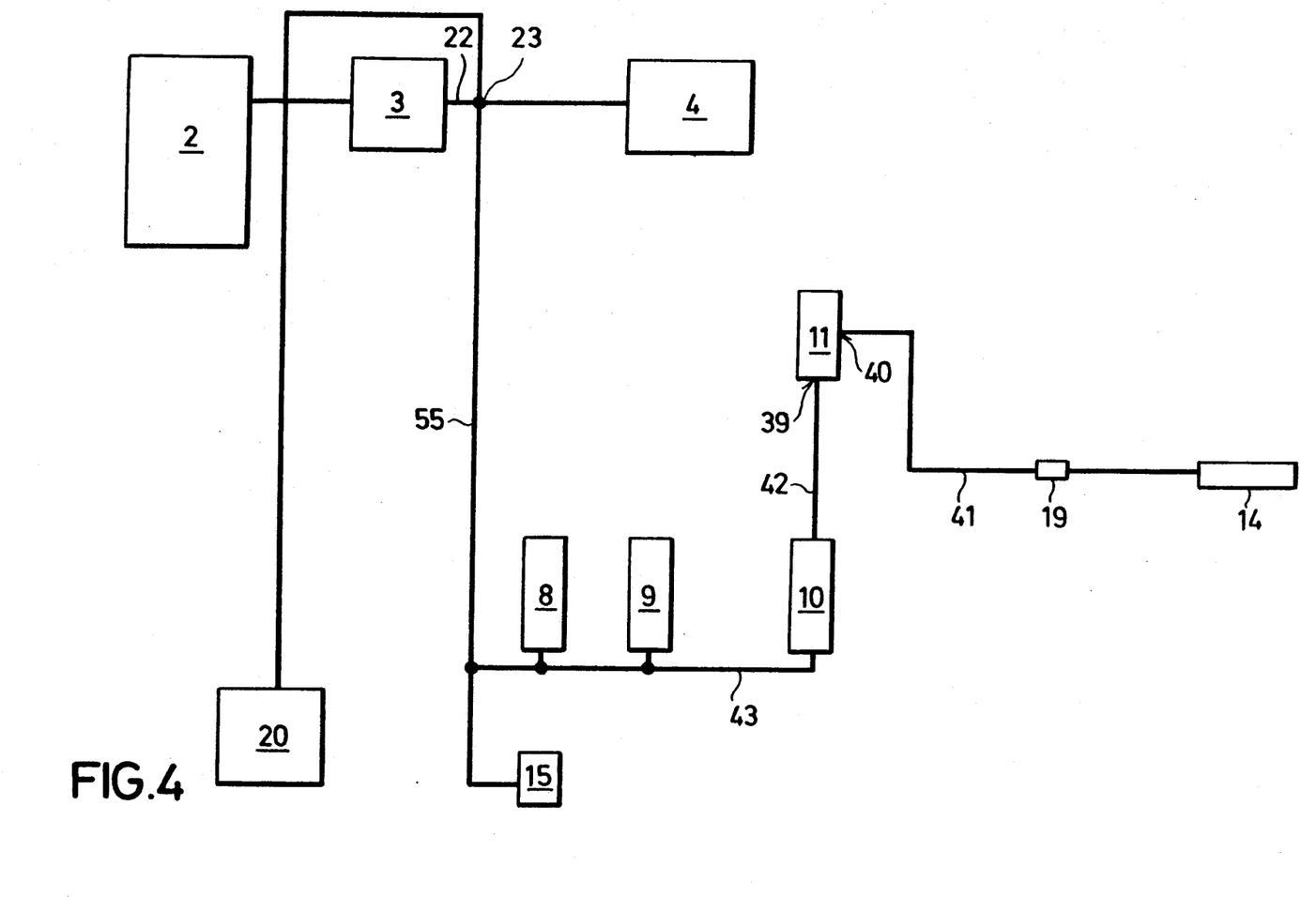
FIG. 4 shows the apparatus according to the invention in the travelling state.

Subsequent to thee start motion procedure, vehicle's travel is adapted to be controlled with the aid of accelerator control solenoid valve 10 in the manner depicted in FIG. 4. Since after termination of the start motion phase illustrated in FIG. 3 the clutch is in its engaged state, the travelling speed can now be increased within the range of the previously selected gear by increasing the pressure applied to the accelerator actuator. The pressure applied to the accelerator actuator via control conduit 42, second inlet port 39 of two-way accelerator valve 11, outlet port 40 of this valve, accelerator control conduit 41 and accelerator control throttle 19 is adjustable by controlling, for instance radio-controlling accelerator control solenoid valve 10. The accelerator actuator is operated in proportion to the applied pressure to thereby vary the travelling speed of the motor vehicle.

Figure 5:
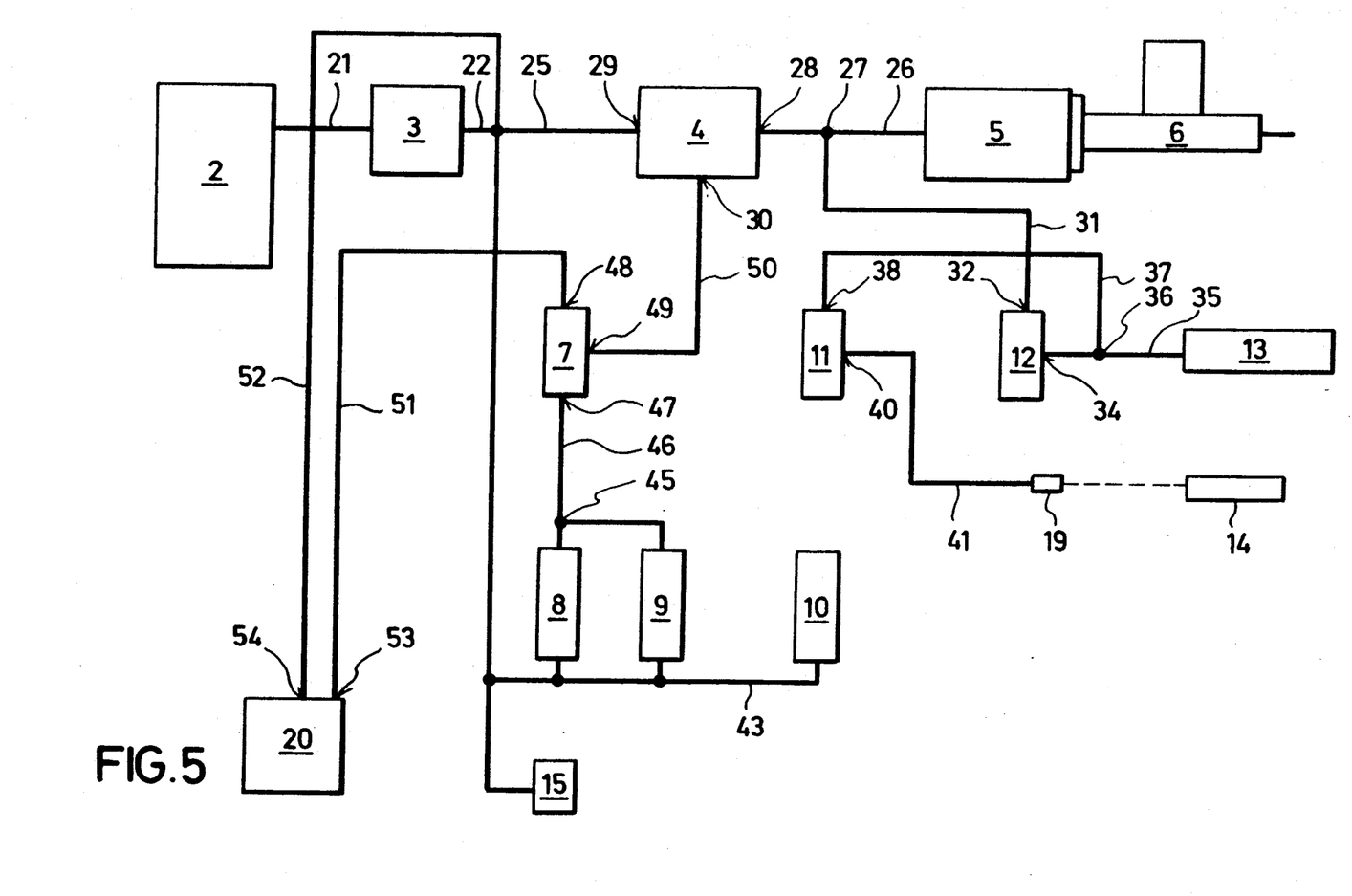
FIG. 5 shows the apparatus according to the invention during a braking operation.

Shown in FIG. 5 are the various possibilities selectively applicable for braking the vehicle or for an emergency braking operation. In this state the various devices required for the start motion procedure, specifically start motion switch 15, and for the travelling state, respectively, specifically accelerator control solenoid valve 10, are deactivated, so that no pressure is applied to accelerator actuator 14.

For the activation of biasing cylinder 5 and main brake cylinder 6, and thus for the actuation of the brakes, relay valve 4 is reset by applying pressure to its control inlet port 30. This results in communication being established between pressure reduction valve 3 and biasing cylinder 5 or main brake cylinder 6, respectively, via brake control conduit 26 and relay conduit 25.

The setting of relay valve 4 is accomplished with the aid of two-way brake valve 7 via its outlet port 49, and relay control conduit 50.

The application of pressure to two-way brake valve 7, and thus the resetting of relay valve 4, can be brought about via first inlet port 47 and/or second inlet port 48 of the two-way valve. In the first case, one of current failure solenoid valve 8 or brake actuation solenoid valve 9 is opened. The current failure solenoid valve is opened as soon as the control system of the vehicle fails, as for instance in the case of a current failure.

In this case current failure solenoid valve 8 acts to connect first inlet port 47 of two-way brake valve 7 to pressure reduction valve 3, so that pressure is applied thereto. The same operation can be intentionally executed in an analogous manner by selective control of brake actuating solenoid valve 9.

In the second case, in which pressure is applied to the second inlet port 48 of two-way brake valve 7, relay valve 4 is operated with the aid of mechanical actuator 20.

Simultaneously with the braking operation, pressure is applied to idling control conduit 31 via branch point 27 in a manner analogous to the pressurization of brake control conduit 26. Clutch actuator 13 is operated via first inlet port 32 of two-way clutch valve 12 and outlet port 34 thereof and clutch control conduit 35 connected thereto for setting the clutch to its release position. The further application of pressure to accelerator actuator 14 via accelerator valve conduit 37 connected to clutch control conduit 35 at branch-off point 36 is prevented by the action of accelerator control throttle 19.

In the described manner it is thus possible to initiate a controlled braking operation either with the aid of brake control solenoid valve 9, or by an operator with the aid of mechanical actuator 20. In the case of failure of the control capabilities, the execution of an emergency braking operation is still possible with the aid of current failure solenoid valve 8. In order to avoid stalling of the vehicle motor as a result of the braking operation while a gear is engaged, clutch actuator 13 is operated at the same time for setting the clutch to its release position. A continued operation of accelerator actuator 14 is prevented by control throttle 19.

When an automatic transmission is used instead of a gear shift transmission, the operation of a clutch is not necessary, and the corresponding actuating devices may be omitted.

Subsequent to the braking operation the control of the vehicle can be continued in the manner described with reference to FIGS. 2 to 4.

I claim:

1. In apparatus for verifying the effects of a motor vehicle accident involving at least one motor vehicle having a drive mechanism, a brake and, optionally, a clutch and being adapted to be directed to a pre-defined point of collision at a predetermined speed to imitate an accident, the improvement comprising a compressed-fluid actuating system (1) including a supply reservoir (2) and selectively controllable valves (4, 7, 8, 9, 10, 11, 12) connected through respective actuators (5, 6, 13, 14) to the vehicle's own drive mechanism, an optionally provided clutch and the vehicle's brake, wherein said pressure supply reservoir (2) is connected in parallel through a relay conduit (25) to an inlet port of a relay valve (4), through a control conduit (55) to brake valves (8, 9), an accelerator control valve (10) and a start motion switch (15), and through a supply conduit (52) to an inlet port of a mechanical actuator (20).

2. Apparatus according to claim 1, further including a pressure reduction valve (3) disposed downstream of said pressure supply reservoir (2).

3. Apparatus according to claim 2, wherein said relay valve (4) has an inlet port (29) connected to said pressure reduction valve (3) and an outlet port (28) connected to said brake actuator (5, 6).

4. Apparatus according to claim 3, wherein said brake actuator (5, 6) is formed as a serial arrangement including a biasing cylinder (5) and a main brake cylinder (6) downstream thereof.

5. Apparatus according to claim 4, further including a brake pressure reduction device (64) is disposed in said main brake cylinder (6).

6. Apparatus according to claim 3, wherein said outlet port (28) of said relay valve (4) is connected to a first inlet port (32) of a two-way clutch valve (12) having its outlet port (34) connected to said clutch actuator (13), and parallel thereto, to a first inlet port (38) of a two-way accelerator valve (11), the outlet port (40) of the latter being connected to said accelerator actuator (14).

7. Apparatus according to claim 6, further comprising an accelerator throttle (19) disposed between said accelerator actuator (14) and said outlet port (40) of said two-way accelerator valve (11).

8. Apparatus according to claim 6, wherein said accelerator control valve (10) is connected to a second inlet port (39) of said two-way accelerator valve (11).

9. Apparatus according to claim 1, wherein said brake valves (8, 9) are connected substantially in parallel to a control inlet port (30) of said relay valve (4).

10. Apparatus according to claim 9, comprising a two-way brake valve (7) is disposed between said brake valves (8, 9) and said relay valve control inlet port (30), its first inlet port (47) being connected to said brake valves (8, 9), and its outlet port (49), to said relay valve control inlet port (30).

11. Apparatus according to claim 10, wherein an outlet port (53) of said mechanical actuator (20) is connected to a second inlet port (48) of said two-way brake valve (7).

12. Apparatus according to claim 10, further including a stop valve (16) disposed between said start motion switch (15) and said two-way clutch valve (12).

13. Apparatus according to claim 12, further including a pressure reduction switch (17) disposed downstream of said stop valve (16) parallel to its connection to said two-way clucth valve (12).

14. Apparatus according to claim 13, further including a throttle (18) disposed downstream of said pressure reduction switch (17).

15. Apparatus according to claim 14, wherein said brake valves (8, 9) and/or said accelerator control valve (10) are/is a solenoid valve.

16. Apparatus according to claim 15, wherein said switches (15, 17) and/or said solenoid valves (8, 9, 10) and/or said throttles (18, 19) are adapted to be radio-controlled.

17. Apparatus according to claim 1, wherein said start motion switch (15) is connected to a second inlet port (33) of said two-way clutch valve (12).

18. Apparatus according to claim 1, wherein said pressure supply reservoir (2) is a compressed-air supply reservoir.

19. A method for verifying the effects of a simulated motor vehicle accident involving at least one motor vehicle directed by a drive mechanism of the vehicle to a pre-defined point of collision at a predetermined speed, which method comprises selectively actuating the vehicle's drive mechanism, an optionally provided clutch and the vehicle's brake by the exertion of pressure, wherein a relay valve, brake valves, and accelerator control valve, a start motion switch and a mechanical actuator are simultaneously operated by pressure from a supply reservoir in a fluid pressure control system.

20. A method according to claim 19, wherein the pressure in said fluid pressure control system is reduced for the operation of said valves, said switches and said actuators.

21. A method according to claim 19, wherein the brakes are connected to said relay valve and controlled by the latter.

22. A method according to claim 21, wherein the operation of said relay valve is controlled via a connection of a control inlet port of said relay valve to said brake valves.

23. A method according to claim 21, wherein in case of failure of the control capabilities of the fluid pressure control system, a brake valve is opened to actuate the brakes through said relay valve.

24. A method according to claim 19, wherein simultaneously with the operation of the brakes the clutch and the accelerator are set to the release position and the idling position, respectively, through transmission means connected to their respective actuators.

25. A method according to claim 19, wherein a connection of said accelerator control valve to said accelerator actuator is operated to control speed variations.

26. A method according to claim 19, wherein the operation of said relay valve is controlled via a connection of the control inlet port of said relay valve to said mechanical actuator.

27. A method according to claim 26, wherein prior to the motion of the motor vehicle being started, said start motion switch is opened, and the clutch and the accelerator are set to the release position and idling position, respectively, through a connection of said start motion switch to the clutch and accelerator actuators, respectively.

28. A method according to claim 27, wherein for starting the motion of the motor vehicle, the start motion switch is closed, and the pressure accumulated between said start motion switch and said clutch and accelerator actuators is reduced by the action of a pressure reduction switch, as a result of which the clutch is set from its release position to its engaged position, and the accelerator is actuated by the reduced throttle effect on the pressure acting on the accelerator actuator.

29. A method according to claim 19, wherein said switch and/or said valves of the fluid pressure control system are radio-controlled.

* * * * *